(12) United States Patent
Kashimoto et al.

(10) Patent No.: US 12,094,201 B2
(45) Date of Patent: Sep. 17, 2024

(54) WARNING SYSTEM, WARNING METHOD, AND COMPUTER PROGRAM PRODUCT

(71) Applicant: KABUSHIKI KAISHA TOSHIBA, Tokyo (JP)

(72) Inventors: Yushiro Kashimoto, Yokohama (JP); Yuto Yamaji, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 267 days.

(21) Appl. No.: 17/184,677

(22) Filed: Feb. 25, 2021

(65) Prior Publication Data

US 2022/0036074 A1 Feb. 3, 2022

(30) Foreign Application Priority Data

Jul. 31, 2020 (JP) ................................ 2020-130622

(51) Int. Cl.
*G06T 7/70* (2017.01)
*G06T 7/20* (2017.01)
(Continued)

(52) U.S. Cl.
CPC ............... *G06V 20/20* (2022.01); *G06T 7/20* (2013.01); *G06T 7/70* (2017.01); *G06V 40/16* (2022.01); *G06T 2207/30196* (2013.01)

(58) Field of Classification Search
CPC ........ G06V 20/20; G06V 40/16; G06V 20/46; G06V 40/172; G06V 20/44; G06V 40/20;
(Continued)

(56) References Cited

U.S. PATENT DOCUMENTS 10,007,269 B1 * 6/2018 Gray .................... G06F 18/2178
10,131,348 B2 * 11/2018 Sugita ....................... G06T 7/70
(Continued)

FOREIGN PATENT DOCUMENTS

JP 2010-198519 A 9/2010
JP 2011-145839 A 7/2011
(Continued)

OTHER PUBLICATIONS

Wu, Renfei, et al. "Modified driving safety field based on trajectory prediction model for pedestrian-vehicle collision." Sustainability 11.22 (2019): 6254. (Year: 2019).*

(Continued)

*Primary Examiner* — Shaghayegh Azima
(74) *Attorney, Agent, or Firm* — Oblon, McClelland, Maier & Neustadt, L.L.P.

(57) ABSTRACT

A warning system according to an embodiment includes an acquisition unit, an analysis unit, and a calculation unit. The acquisition unit acquires, from first sensor data including information on a target, condition information on the target. The analysis unit analyzes, from second sensor data including information on a region, current state information on an object included in the region and action prediction information on the object. The calculation unit calculates a degree of caution, based on the condition information on the target, the current state information on the object, and the action prediction information on the object.

17 Claims, 8 Drawing Sheets

(51) Int. Cl.
*G06V 20/20* (2022.01)
*G06V 40/16* (2022.01)

(58) Field of Classification Search
CPC ... G06T 7/70; G06T 7/20; G06T 2207/30196; G06T 2207/10016; G06T 2207/30201; H04N 7/185; H04N 7/188; G08B 21/22
See application file for complete search history.

(56) References Cited

U.S. PATENT DOCUMENTS

| | | | |
|---|---|---|---|
| 10,325,485 | B1 | 6/2019 | Schuster |
| 2017/0278362 | A1* | 9/2017 | Sekine ............... G07G 1/0036 |
| 2018/0357247 | A1* | 12/2018 | Siminoff .......... G08B 13/19606 |
| 2020/0079362 | A1* | 3/2020 | Kingman ............. B60R 19/483 |
| 2021/0279486 | A1* | 9/2021 | Nguyen ................ G06V 40/10 |
| 2021/0394793 | A1* | 12/2021 | Austin ................ B60Q 1/5037 |
| 2022/0403619 | A1* | 12/2022 | Sasaki ..................... E02F 9/205 |

FOREIGN PATENT DOCUMENTS

| | | | | |
|---|---|---|---|---|
| JP | 2017-033047 A | 2/2017 | | |
| JP | 2019-168996 A | 10/2019 | | |
| JP | 2020-095617 A | 6/2020 | | |
| JP | 2021102902 A | * 7/2021 | ............. | E02F 9/205 |
| KR | 10-2020-0022229 A | 3/2020 | | |

OTHER PUBLICATIONS

Wu et al. ;"Modified Driving Safety Field Based on Trajectory Prediction Model for Pedestrian-Vehicle Collision"; Sustainability, 2019 (Year: 2019).*
Wu et al. Modified Driving Safety Field Based on Trajectory Prediction Model for Pedestrian-Vehicle Collision; sustainability (Year: 2019).*
Liu, W. et al., "SSD: Single Shot MultiBox Detector," European Conference on Computer Vision, Springer, Cham. 2016, arXiv:1512.02325v5 [cs.CV], Dec. 29, 2016, 17 pages.
He, K. et al., "Deep Residual Learning for Image Recognition," Proceedings of the IEEE conference on computer vision and pattern recognition, 2016, arXiv:1512.03385v1 [cs.CV], Dec. 10, 2015, 12 pages.
Cao, Z. et al., "OpenPose: Realtime Multi-Person 2D Pose Estimation using Part Affinity Fields," IEEE Transactions on Pattern Analysis and Machine Intelligence, arXiv:1812.0808v1 [cs.CV], Dec. 18, 2018, 14 pages.
Japanese Office Action fated Jun. 25, 2024, issued in Japanese Patent Application No. 2020-130622 (with English translation).

* cited by examiner

WARNING SYSTEM, WARNING METHOD, AND COMPUTER PROGRAM PRODUCT

CROSS-REFERENCE TO RELATED APPLICATIONS

This application is based upon and claims the benefit of priority from Japanese Patent Application No. 2020-130622, filed on Jul. 31, 2020; the entire contents of which are incorporated herein by reference.

FIELD

Embodiments described herein relate generally to a warning system, a warning method, and a computer program product.

BACKGROUND

Conventionally known has been a technique of detecting a person having entered in the surrounding of a machine in operation. For example, conventionally known has been a technique of determining whether or not anyone has entered a surveillance area on the basis of a picture captured by a surveillance camera in a factory and reporting in accordance with the operation condition of an equipment in the surveillance area.

However, conventional techniques have difficulty in giving a warning before entry to a dangerous region while unnecessary alert notification is suppressed.

DETAILED DESCRIPTION

A warning system according to an embodiment includes an acquisition unit, an analysis unit, and a calculation unit. The acquisition unit is configured to acquire, from first sensor data including information on a target, condition information on the target. The analysis unit is configured to analyze, from second sensor data including information on a region, current state information on an object included in the region and action prediction information on the object. The calculation unit is configured to calculate a degree of caution, based on the condition information on the target, the current state information on the object, and the action prediction information on the object.

Embodiments of a warning system, a warning method, and a program will be described in detail below with reference to the accompanying drawings.

First Embodiment

A warning system according to a first embodiment gives a warning in a case where someone tries to approach or come in contact with, for example, a machine in operation or a person who is working and needs concentration, for example, in a factory or at a construction site.

First, an exemplary functional configuration of the warning system according to the first embodiment will be described.

Exemplary Functional Configuration

Figure 1:
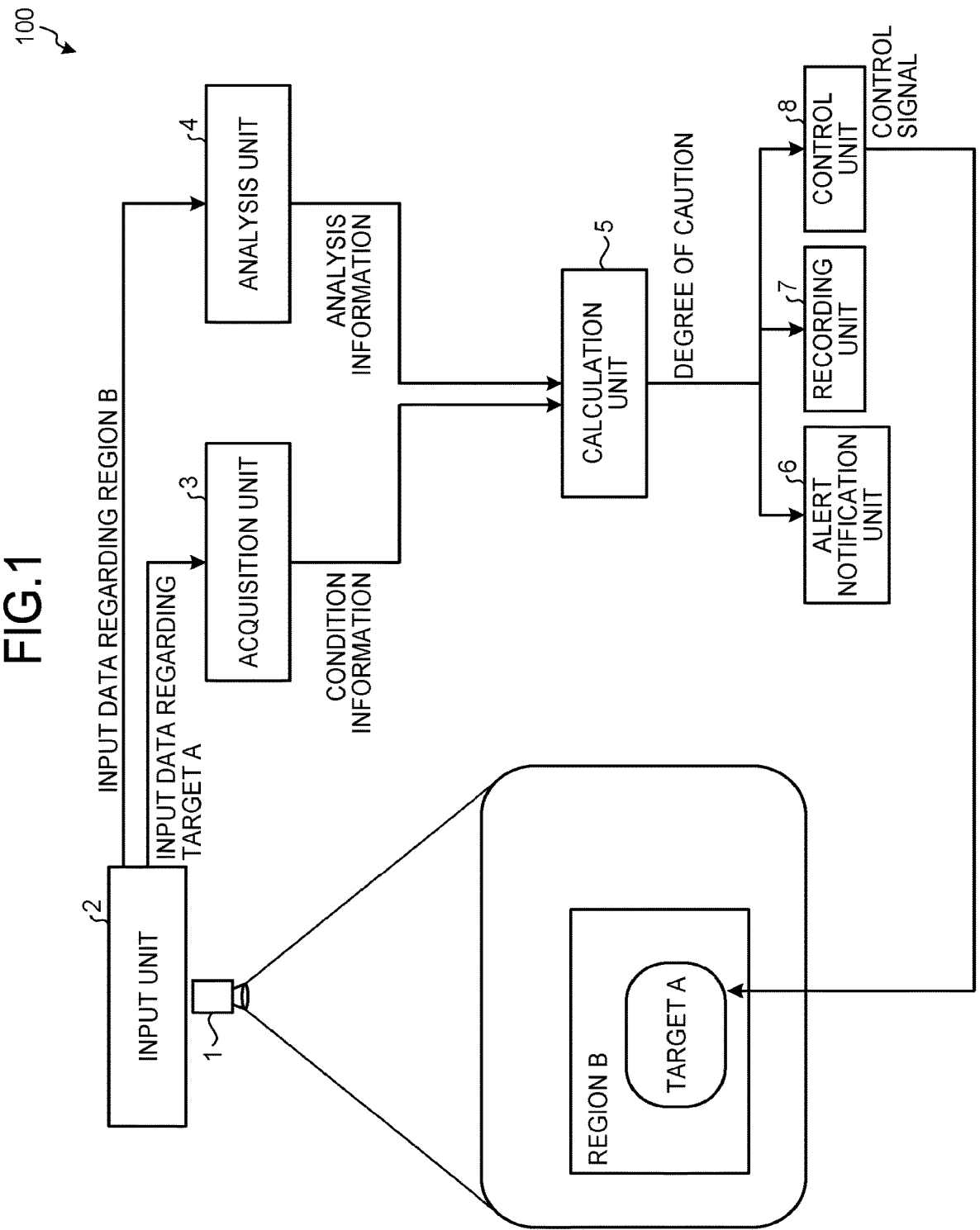
FIG. 1 illustrates an exemplary functional configuration of a warning system according to a first embodiment.

FIG. 1 illustrates an exemplary functional configuration of the warning system 100 according to the first embodiment. The warning system 100 according to the first embodiment includes a sensor 1, an input unit 2, an acquisition unit 3, an analysis unit 4, a calculation unit 5, an alert notification unit 6, a recording unit 7, and a control unit 8.

The sensor 1 detects data of a target A and data of a region B. The target A is, for example, a machine in a factory or heavy machinery at a construction site. For example, the target A may be a person or a robot at dangerous work.

The region B varies in the degree of required caution, in accordance with the motion (operation) condition of the target A. The region B is, for example, in a predetermined range from the target A. Note that the region B may include the target A or may include no target A.

The sensor 1 includes, for example, a camera and a vibration sensor that detect the respective conditions of the target A and the region B. The condition of the target A is detected, for example, on the basis of image data and vibration-sensor data. The condition of the region B is acquired, for example, on the basis of image data and depth data.

Note that a plurality of targets A and a plurality of regions B may be present. The sensor 1 may include a plurality of sensors to detect data with different types of sensors to the target A and the region B.

The input unit 2 inputs the data regarding the target A acquired by the sensor 1 to the acquisition unit 3, and inputs the data regarding the region B to the analysis unit 4.

The acquisition unit 3 acquires condition information on the target A from the data regarding the target A, and inputs the condition information on the target A to the calculation unit 5. In a case where the target A is, for example, a machine, the condition information includes information indicating the operation condition of the machine. In a case where the target A is, for example, a person or a robot, the condition information includes information indicating the motion condition of the person or the robot.

The analysis unit 4 detects a specific object in the region B from the data regarding the region B and performs, for example, analysis of the state of the detected object and action prediction of the detected object. Then, the analysis unit 4 inputs analysis information including state information and action prediction information on the object, to the calculation unit 5. Examples of an object to be analyzed include a person, a vehicle, an animal, and a machine having a travel function.

With image data as input data to each of the acquisition unit 3 and the analysis unit 4, image processing may be performed for acquisition of the condition information on the target A and for detection and action prediction of an object in the region B. Use of image data as input data enables acquisition of input data with an installed camera without a special sensor (e.g., a vibration sensor or an acceleration sensor), so that the introduction cost of the warning system 100 can be inhibited. Data is easy for people to understand intuitively, resulting in acquisition of an effect of facilitating a breakdown of an analysis result.

In a case where image data is used as input data, for example, the analysis unit 4 receives a plurality of pieces of image data on a time-series basis and tracks an object included in a plurality of pieces of image data, calculating the travel direction and speed of the object. Then, the analysis unit 4 analyzes action prediction information on the object, on the basis of the travel direction and speed of the object. Use of image data does not necessarily require tracking of an object. Thus, on the basis of posture information and motion information on an object, the analysis unit 4 may analyze action prediction information on the object.

The calculation unit 5 calculates the degree of caution from the condition information acquired by the acquisition unit 3 (e.g., the operation condition of the target A) and the analysis information acquired by the analysis unit 4 (e.g., current state information and action prediction information on an object included in the region B). For example, in a case where it is identified from the condition information on the target A that the target A is in operation or in motion, the calculation unit 5 calculates the degree of caution higher as the object is more likely to approach or come in contact with the target A, on the basis of the current state information on the object and the action prediction information on the object. The calculation unit 5 inputs the calculated degree of caution to at least one of the alert notification unit 6, the recording unit 7, and the control unit 8.

The alert notification unit 6 issues an alert notification with a method of some kind in a case where the degree of caution is higher than a threshold, to notify, for example, any person around the target A or the region B and the administrator of occurrence of a situation requiring caution. For example, the alert notification unit 6 may determine the degree of caution on the basis of a plurality of thresholds and may perform control such that an alert notification method is selected in accordance with the level of the degree of caution.

Note that any alert notification method may be provided. For example, the alert notification unit 6 generates an alarm audible to any person around the target A. For example, the alert notification unit 6 notifies the chief administrator of occurrence of a situation requiring caution, for example, by e-mail. The warning system 100 including the alert notification unit 6 enables, for example, notification of a state requiring caution to any person and the supervisor in a site, so that an accident or the like can be prevented from occurring.

The recording unit 7 records, in a case where the degree of caution is higher than the threshold, at least one of sensor data including information on the target A, sensor data including information on the region B, the condition information on the target A, current state information on an object included in the region B, action prediction information on the object, and the degree of caution calculated by the calculation unit 5. Note that information to be stored in the recording unit 7 may include not only information at the time of calculation of the degree of caution higher than the threshold, but also information in certain periods before and after the time of calculation of the degree of caution higher than the threshold. The warning system 100 including the recording unit 7 enables, for example, the administrator of the target A to review information on the scene of occurrence of a state requiring caution, resulting in improvement of risk management.

The control unit 8 makes, in a case where the degree of caution calculated with the target A in operation is higher than the threshold, the target to be in a safe state, for example, with a method of sending a control signal of causing the target A to stop. The control unit 8 inhibits, in a case where the degree of caution calculated with the target A remaining stopped is higher than the threshold, the operation of the target A, for example, with a method of inhibiting transmission of a control signal of causing the target A to operate. The warning system 100 including the control unit 8 enables, in a state requiring caution, the target A to be in a safe state, so that an accident or the like can be prevented from occurring.

Exemplary Operation of Acquisition Unit

Figure 2:
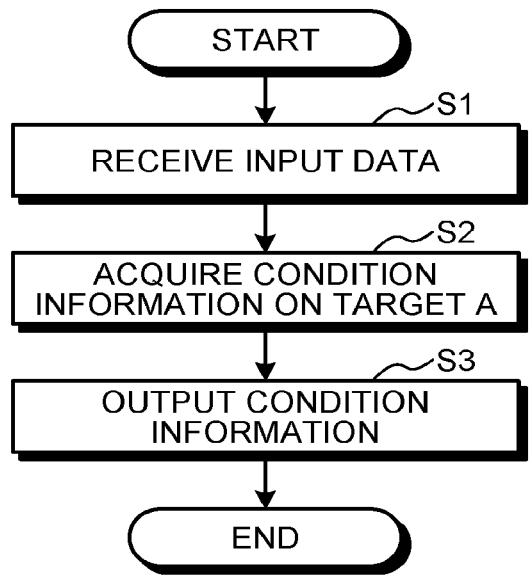
FIG. 2 is a flowchart of an exemplary operation of an acquisition unit according to the first embodiment.

FIG. 2 is a flowchart of an exemplary operation of the acquisition unit 3 according to the first embodiment. First, the acquisition unit 3 receives, as input data, the sensor data including the information on the target A, from the input unit 2 (Step S1). Note that the acquisition unit 3 may directly receive, as input data, a signal from the target A.

Next, the acquisition unit 3 analyzes the information on the target A received in the processing of Step S1, to acquire the condition information on the target A (Step S2). For example, in a case where image data is provided as the information on the target A, the acquisition unit 3 analyzes motion information based on the image of the preceding frame, with optical flow. For example, from the direction and magnitude of optical flow regarding the target A, the acquisition unit 3 converts the condition of operation (or motion) of the target A into numbers. For example, in a case where detected is a value larger than a threshold in a previously arranged direction, the acquisition unit 3 acquires the condition information indicating the target A in operation (or in motion). In a case where detected is a value not more than the threshold in the previously arranged direction, the acquisition unit 3 acquires the condition information indicating the target A remaining stopped (or remaining stationary).

Next, the acquisition unit 3 outputs the condition information acquired in the processing of Step S2 (Step S3). The condition information includes, for example, whether or not the target A is in operation (or in motion) and a numerical value indicating the condition of operation (or motion) of the target A. In a case where a plurality of targets A is present, the acquisition unit 3 outputs, as the condition information, for example, the logical sum or logical product of whether or not the plurality of targets A is in operation (or in motion) or the weighted sum of the numerical values.

In a case where a plurality of targets A is present, the acquisition unit 3 may perform the processing of FIG. 2 with respective different parameters to the plurality of targets A. In warning, use of respective different parameters to a plurality of targets A of which the conditions of operation (or motion) require grasping enables optimization of acquisition processing to the conditions of operation (or motion).

Exemplary Operation of Analysis Unit

Figure 3:
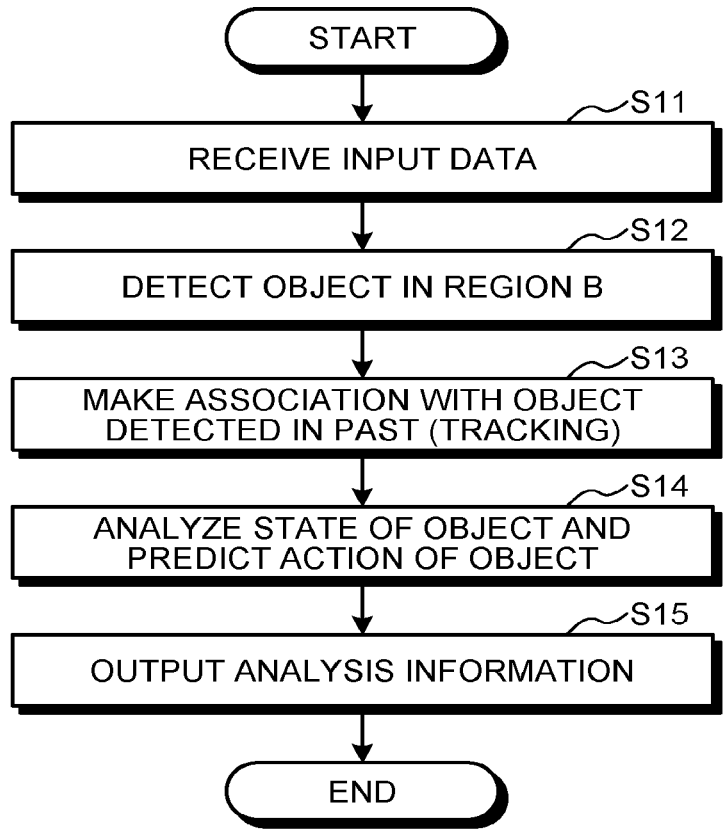
FIG. 3 is a flowchart of an exemplary operation of an analysis unit according to the first embodiment.

FIG. 3 is a flowchart of an exemplary operation of the analysis unit 4 according to the first embodiment. First, the analysis unit 4 receives the data regarding the region B from the input unit 2 (Step S11).

Next, the analysis unit 4 performs detection of an object in the region B and outputs the position of the object and a detection score indicating the accuracy of detection of the object (Step S12). For example, in a case where image data is provided as the data regarding the region B, for detection of an object, the processing of Step S12 is performed with a method, such as SSD.

Next, the analysis unit 4 associates the object detected in the processing of Step S12 with an object detected in the past, with positional information and feature information on the object, to track the object (Step S13). For example, the analysis unit 4 associates the detected object with an object that is close in position in the next previous frame (e.g., an object smaller in distance than a threshold) and is similar to the detected object in features extracted (e.g., an object smaller in difference in features than a threshold), for example, by ResNet. Proceedings of the IEEE conference on computer vision and pattern recognition. 2016), and tracks the object. In the processing of Step S13, calculated can be the travel locus of each object or each person until now and the travel speed and travel direction at the present time.

Next, the analysis unit 4 analyzes the current state of each object detected in the processing of Step S13 and additionally predicts the action after the current and past states, to acquire analysis information including current state information and action prediction information (Step S14). Examples of the state of an object to be analyzed include the position, orientation, travel speed, and posture of a part of the object. In action prediction, for example, a predicted travel destination, an estimated probability score, a predicted action, and the estimated probability score of the action are calculated, for example, by linear prediction or Kalman filtering. Specifically, for action prediction of a person, the analysis unit 4 performs action prediction including, for example, the motion of the person, on the basis of current positional information on the person, information on an object that the person possesses, the travel locus until now acquired from a tracking result of the person, posture information, and the like. For example, in a case where image data is provided as the data regarding the region B, the posture information includes, for example, the orientations of the body and head of the person and the positions of the arms and legs of the person that are acquired by a technique, such as OpenPose. The analysis unit 4 successively analyzes the state of the person in a plurality of frames by tracking the person, so that current state information on the person and action prediction information on the person can be acquired with higher accuracy.

Next, the analysis unit 4 outputs the analysis information acquired in the processing of Step S14 (Step S15). Note that, in a case where a plurality of regions B is present, the analysis information in all the regions B is output.

In a case where a plurality of regions B is present, the analysis unit 4 may perform the processing of FIG. 3 with respective different parameters to the plurality of regions B. In warning, use of respective different parameters to a plurality of regions B in which an object, such as a person, is likely to be detected enables optimization of analysis in the plurality of regions B.

Exemplary Operation of Calculation Unit

Figure 4:
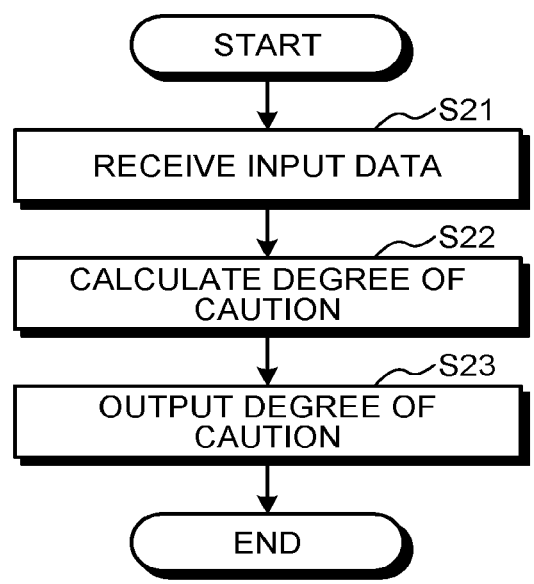
FIG. 4 is a flowchart of an exemplary operation of a calculation unit according to the first embodiment.

FIG. 4 is a flowchart of an exemplary operation of the calculation unit 5 according to the first embodiment. First, the calculation unit 5 receives the condition information from the acquisition unit 3 and the analysis information from the analysis unit 4 (Step S21).

Next, the calculation unit 5 calculates the degree of caution in accordance with an indicator based on definition information in which conditions requiring caution are defined (Step S22). For example, in a case where the target A is a machine and "the approach of a person to the machine in operation" is defined as a condition requiring caution, conceivable examples of an indicator for calculation of the degree of caution include "a condition in which present is a person approaching the machine at a certain speed or more", "a condition in which the distance between a person and the machine is shorter than a certain distance", and "a condition in which a person is predicted to approach the machine because of the line of sight and body of the person oriented to the machine" in the region B in the surrounding of the machine in operation. Thus, at the time of practical use of the warning system 100, at least one indicator suitable to the scene is set from a plurality of indicators. The calculation unit 5 calculates the degree of caution in accordance with an expression based on the set at least one indicator.

In practical use of the warning system 100, the analysis unit 4 analyzes, in each frame, for example, the position, travel direction, speed, line-of-sight direction, and body orientation of a person. The calculation unit 5 calculates the degree of caution to each person, in accordance with an indicator, such as "calculate a higher value at a higher speed of a person with the travel direction of the person close to the direction from the person to the machine", "calculate a higher value at a shorter distance between a person and the machine", or "calculate a higher value with the line of sight and body of a person oriented in a direction closer to the direction from the person to the machine".

Note that, in a case where two indicators or more are used, the calculation unit 5 calculates the degree of caution to each person, on the basis of the weighted sum of the respective calculated degrees of caution based on the indicators or by conditional branching of respective threshold determination results based on the indicators (AND or determination). Then, in a case where it is determined that the target A is in motion (or in operation in a case where the target A is, for example, a device) from the condition information acquired from the acquisition unit 3, the calculation unit 5 calculates, as the degree of caution to the entire warning system 100, the maximum value among the degrees of caution to the persons or the total value of the degrees of caution to the persons.

Next, the calculation unit 5 outputs the degree of caution acquired in the processing of Step S22 (Step S23).

As described above, in the warning system 100 according to the first embodiment, the acquisition unit 3 acquires the condition information on the target A from the sensor data including the information on the target A (first sensor data). The analysis unit 4 analyzes current state information on an object included in the region B and action prediction information on the object from the sensor data including the information on the region B (second sensor data). Then, the calculation unit 5 calculates the degree of caution, on the basis of the condition information on the target A, the current state information on the object, and the action prediction information on the object.

Thus, the warning system 100 according to the first embodiment is capable of giving a warning before entry to a dangerous region, with inhibition of unnecessary alert notification. Specifically, for warning only in a condition truly requiring caution, the acquisition unit 3 acquires the condition information on the target A. The analysis unit 4 predicts the action of an object included in the region B, and the calculation unit 5 utilizes a prediction result from the analysis unit 4 for calculation of the degree of caution. Thus, with inhibition of unnecessary warning, a condition requiring caution can be dealt properly with in accordance with the degree of caution thereto. For example, the warning system 100 according to the first embodiment enables prevention of an accident from occurring because the alert notification unit 6 issues an alert notification before a person enters into the surrounding of the machine in operation.

Meanwhile, according to conventional techniques, expansion of a region in which entry detection is performed for prevention of danger from occurring causes a new problem that unnecessary alert notification is likely to occur. The warning system 100 according the first embodiment performs not only entry detection but also action prediction of a person or the like, so that only a condition truly requiring caution can be detected, resulting in prevention of danger from occurring.

According to conventional techniques, whether or not an alert notification should be issued is determined in accordance with the operation condition at the time of entry detection. Therefore, disadvantageously, performed is no flexible addressing based on consideration of the entire condition. Meanwhile, the warning system 100 according to the first embodiment, including the calculation unit 5 described above, enables calculation of the degree of caution meeting a larger number of conditions, so that a warning can be given to a user with a method corresponding to the calculated degree of caution.

Second Embodiment

Next, a second embodiment will be described. In the following description, the similarity between the second embodiment and the first embodiment will be omitted and the difference between the second embodiment and the first embodiment will be given.

Exemplary Functional Configuration

Figure 5:
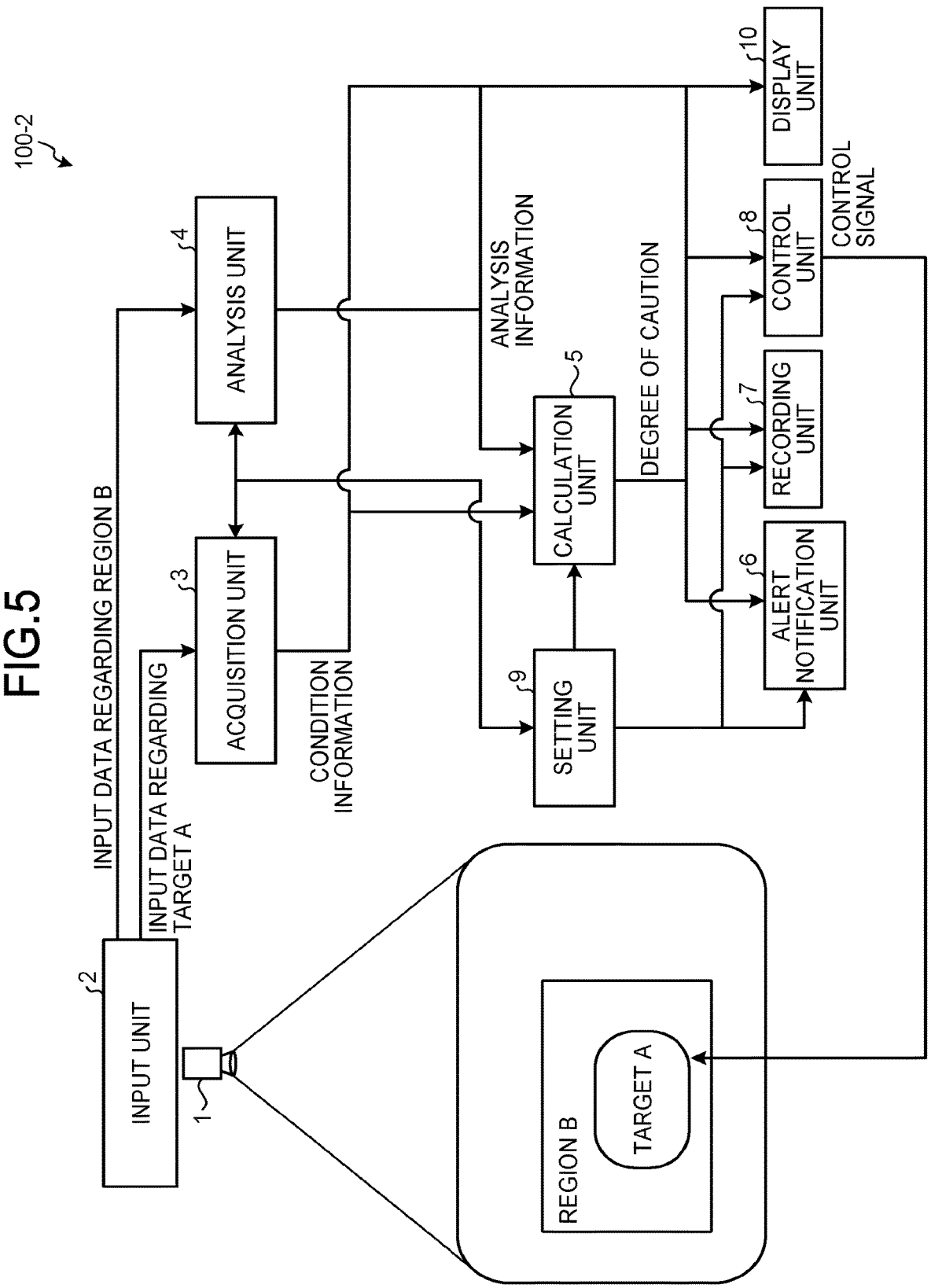
FIG. 5 illustrates an exemplary functional configuration of a warning system according to a second embodiment.

FIG. 5 illustrates an exemplary functional configuration of a warning system 100-2 according to the second embodiment. The warning system 100-2 according to the second embodiment includes a sensor 1, an input unit 2, an acquisition unit 3, an analysis unit 4, a calculation unit 5, an alert notification unit 6, a recording unit 7, a control unit 8, a setting unit 9, and a display unit 10.

The second embodiment is different in configuration from the first embodiment in that the setting unit 9 and the display unit 10 are further provided.

The setting unit 9 sets a parameter used for controlling the operation of each unit (e.g., the acquisition unit 3, the analysis unit 4, and the calculation unit 5). The setting unit 9 may receive a parameter setting for each unit through a setting UI or may set a parameter determined automatically by machine learning.

Exemplary Setting UI

Figure 6:
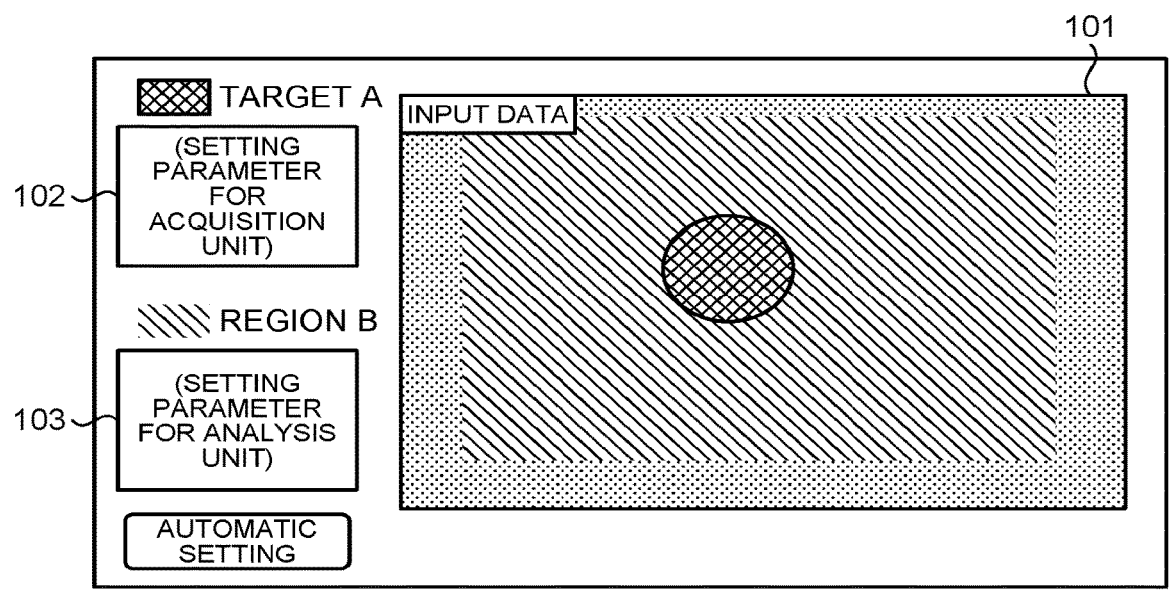
FIG. 6 illustrates an exemplary setting UI for parameters according to the second embodiment.

FIG. 6 illustrates an exemplary setting UI for parameters according to the second embodiment. The setting UI includes, for example, a setting region 101 for setting a target A and a region B, a setting region 102 for setting the parameter used for controlling the operation of the acquisition unit 3 that acquires condition information on the target A (e.g., a parameter for use in calculation of optical flow), and a setting region 103 for setting the parameter used for controlling the operation of the analysis unit 4 that analyzes an object in the region B (e.g., a parameter used for a machine-learning model for use in analysis). In a case where input data input to the input unit 2 is image data, the setting unit 9 displays the image data onto the setting region 101 and receives, on the image data, settings for the target A and the region B.

The setting unit 9 sets the parameter used for controlling the operation of the calculation unit 5 (e.g., a parameter used for setting a method of calculating the degree of caution) and a threshold for the degree of caution to be referred to in the alert notification unit 6, the recording unit 7, and the control unit 8.

In a case where a plurality of targets A and a plurality of regions B are present, the setting unit 9 sets the parameter used for controlling the operation of the acquisition unit 3 to each target A and sets the parameter used for controlling the operation of the analysis unit 4 to each region B.

The setting unit 9 provided enables optimization of parameters after introduction of the warning system 100-2. For example, addressing is facilitated to a change made in a condition requiring caution.

The display unit 10 displays display information including a processing result from each unit (e.g., at least one of the condition information on the target A acquired by the acquisition unit 3, current state information on an object included in the region B and action prediction information on the object, analyzed by the analysis unit 4, and the degree of caution calculated by the calculation unit 5). For example, the display unit 10 displays the processing result from each unit as necessary in the surrounding of the input data (e.g., image data) or in superimposition on the input data.

Exemplary Display Information

Figure 7:
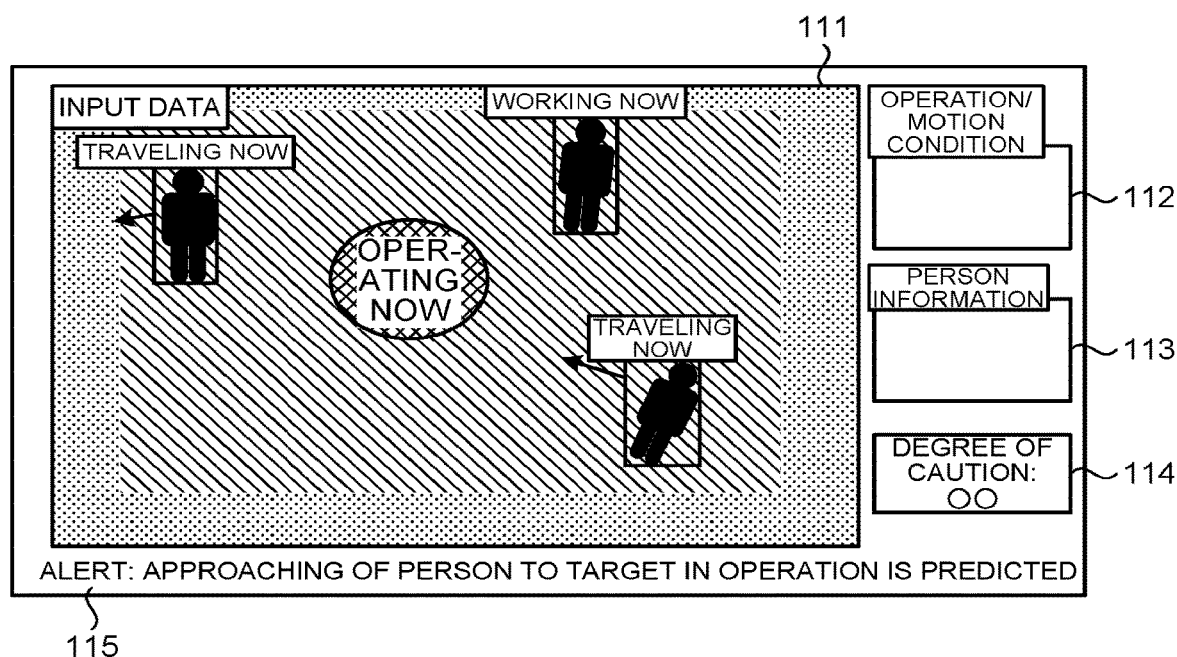
FIG. 7 illustrates exemplary display information according to the second embodiment.

FIG. 7 illustrates exemplary display information according to the second embodiment. In a case where an image is used as input data, the display unit 10 displays, for example, the operation (or motion) condition of the target A and the position, action, and travel destination of an object, such as a person, detected in the region B in superimposition on a display region 111 indicating image data. The display unit 10 displays information onto display regions 112 to 115 in the surrounding of the display region 111. On the display region 112, detail information in the operation/motion condition is displayed (e.g., the speed of motion of the target A). On the display region 113, person information is displayed (e.g., the action or state of a person and the coordinates indicating the position of a rectangle indicating the person). On the display region 114, the degree of caution is displayed (e.g., a numerical value, letters, or level). On the display region 115, displayed is text indicating, for example, the analyzed condition.

The display unit 10 provided facilitates understanding of the reason for the degree of caution, the cause of the requirement of caution, and the condition requiring caution, enabling more proper addressing.

Third Embodiment

Next, a third embodiment will be described. In the following description, the similarity between the third embodiment and the first embodiment will be omitted and the difference between the third embodiment and the first embodiment will be given.

Exemplary Functional Configuration

Figure 8:
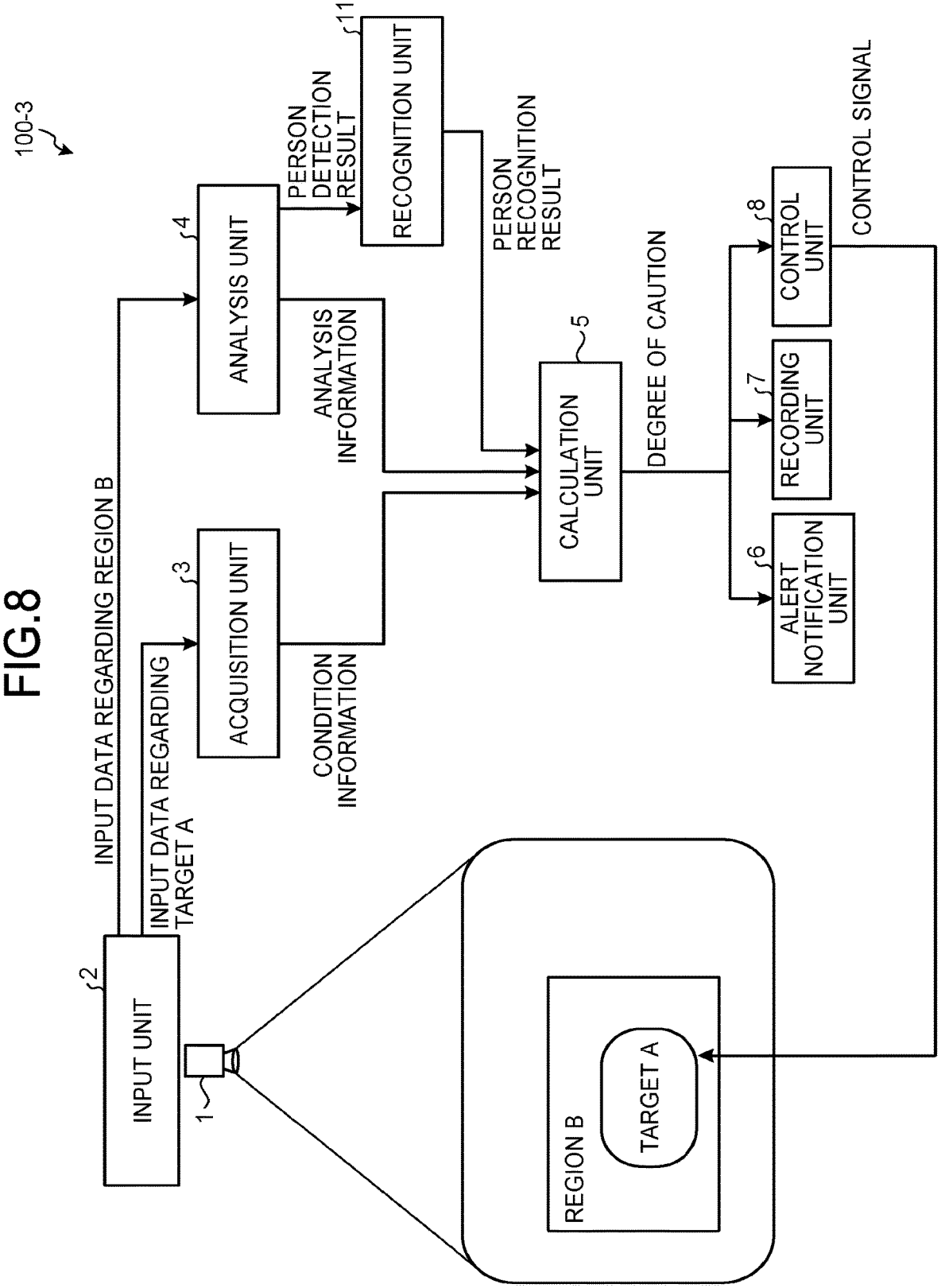
FIG. 8 illustrates an exemplary functional configuration of a warning system according to a third embodiment.

FIG. 8 illustrates an exemplary functional configuration of a warning system 100-3 according to the third embodiment. The warning system 100-3 according to the third embodiment includes a sensor 1, an input unit 2, an acquisition unit 3, an analysis unit 4, a calculation unit 5, an alert notification unit 6, a recording unit 7, a control unit 8, and a recognition unit 11.

The third embodiment is different in configuration from the first embodiment in that the recognition unit 11 is further provided.

The recognition unit 11 collates a person with known person information to recognize the person. Specifically, in a case where a person is detected by the analysis unit 4, the recognition unit 11 identifies, for example, the individual and attributes of the detected person with face information, body-shape information, clothes information, motion information, and the like. Note that an attribute indicates information on a person within a range in which the individual is not completely identified, such as an unknown person, a person in a specific position (e.g., in charge of a job), or a person belonging to a specific organization.

The person information acquired by the recognition unit 11 is input to the calculation unit 5, so that the person information is utilized in calculation of the degree of caution. For example, the calculation unit 5 makes the degree of caution higher in a case where an unknown person is detected than in a case where a specific person is detected. For example, the calculation unit 5 makes the degree of caution lower in a case where a person trying to approach a machine in operation is a skilled worker in the site or at work than in a case where the person is an unskilled worker.

For example, in accordance with the identified individual and attributes of a person, the method of issuing an alert notification by the alert notification unit 6 may be changed to, for example, alert notification to the person, the supervisor of the person, and the like, by e-mail.

In a case where the degree of caution is higher than a threshold, the recording unit 7 may further store, for example, the individual and attributes of a person to be given a warning.

In a case where a setting unit 9 is further provided similarly to the second embodiment, a parameter used for controlling the operation of the recognition unit 11 may be allowed to be set.

In a case where a display unit 10 is further provided similarly to the second embodiment, the person information recognized by the recognition unit 11 may be further included in display information.

The recognition unit 11 provided can identify, for example, the position, role, and ability of a detected person, so that the degree of caution can be flexibly changed in accordance therewith. A person having caused a condition requiring caution can be identified, so that facilitation of improvement of risk management can be expected.

Fourth Embodiment

Next, a fourth embodiment will be described. In the following description, the similarity between the fourth embodiment and the third embodiment will be omitted and the difference between the fourth embodiment and the third embodiment will be given.

Exemplary Functional Configuration

Figure 9:
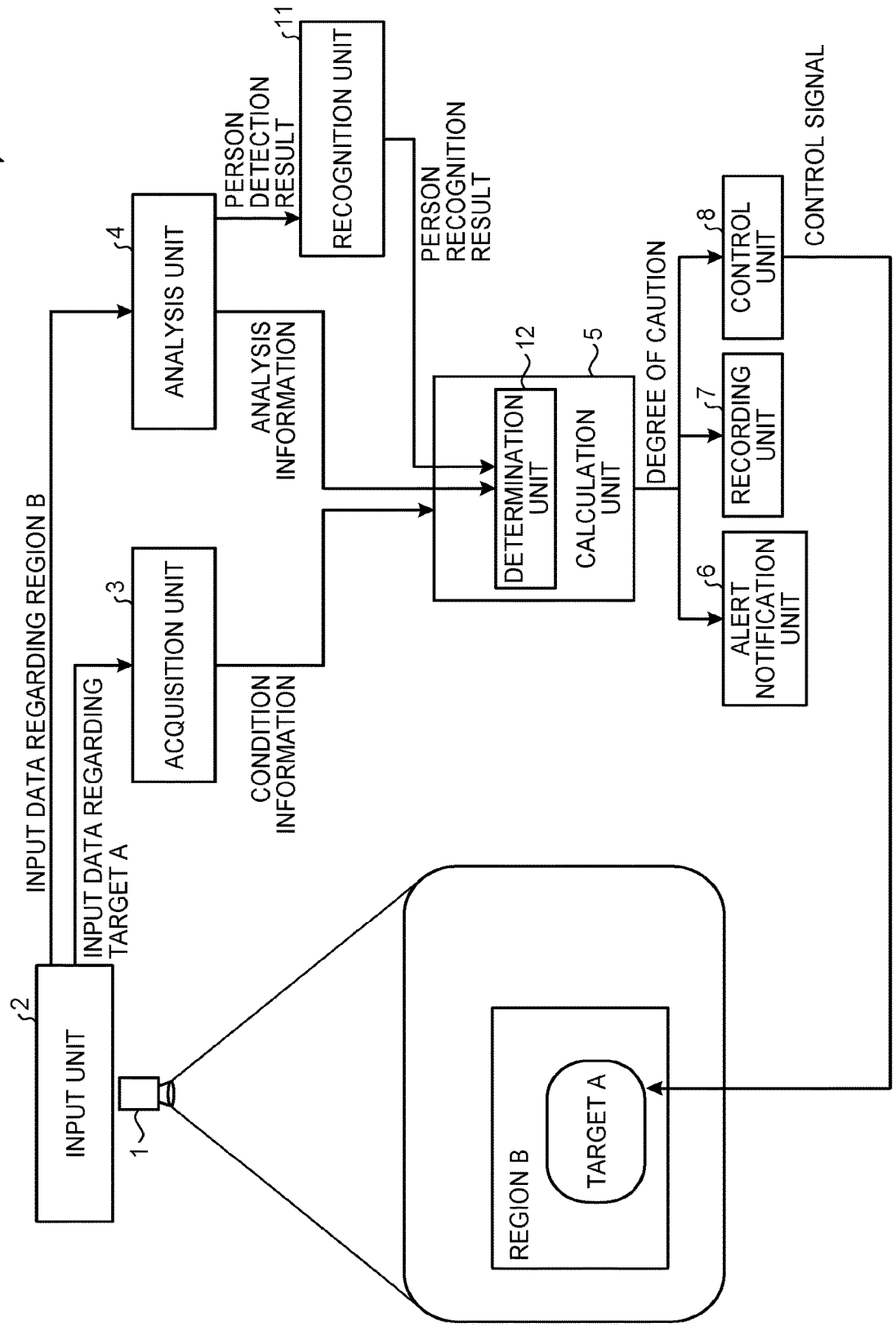
FIG. 9 illustrates an exemplary functional configuration of a warning system according to a fourth embodiment.

FIG. 9 illustrates an exemplary functional configuration of a warning system 100-4 according to the fourth embodiment. The warning system 100-4 according to the fourth embodiment includes a sensor 1, an input unit 2, an acquisition unit 3, an analysis unit 4, a calculation unit 5, an alert notification unit 6, a recording unit 7, a control unit 8, a recognition unit 11, and a determination unit 12.

The fourth embodiment is different from the third embodiment in that the determination unit 12 is further provided inside the calculation unit 5.

The determination unit 12 determines whether or not a predetermined number of persons are at predetermined positions in predetermined states. Specifically, the determination unit 12 determines a condition in which an excessively small number of supervisors or workers are in the surrounding of a machine or the like in operation or a condition in which a previously arranged number of supervisors or workers are not in proper states at previously arranged positions, for example, due to looking aside.

The calculation unit 5 calculates a predetermined degree of caution determined in accordance with a processing result from the determination unit 12. For example, in a condition in which the number of persons in a region B is excessively small or in a condition in which no specific person is present in the region B, the calculation unit 5 calculates the degree of caution determined in accordance with the risk of the condition. For example, in a condition in which a person itself is detected but the person is looking aside or does not have a specific attribute, such as the qualification of administration, the calculation unit 5 calculates the degree of caution determined in accordance with the risk of the condition. For example, in a case where the region B is a place where work requires a predetermined number of persons (e.g., two persons), the calculation unit 5 calculates, in a condition in which the number of persons at work is less than the predetermined number of persons, the degree of caution determined in accordance with the risk of the condition.

The determination unit 12 provided achieves an effect of detecting a condition in which safety is not ensured, such as a condition in which no supervisors and no workers are present, a condition in which a supervisor, a worker, or the like is improper (e.g., a condition in which looking aside is made), or a condition in which the previously arranged number of workers is not satisfied.

Finally, an exemplary hardware configuration for the warning systems 100 (100-2 to 100-4) according to the first to fourth embodiments will be described.

Exemplary Hardware Configuration

Figure 10:
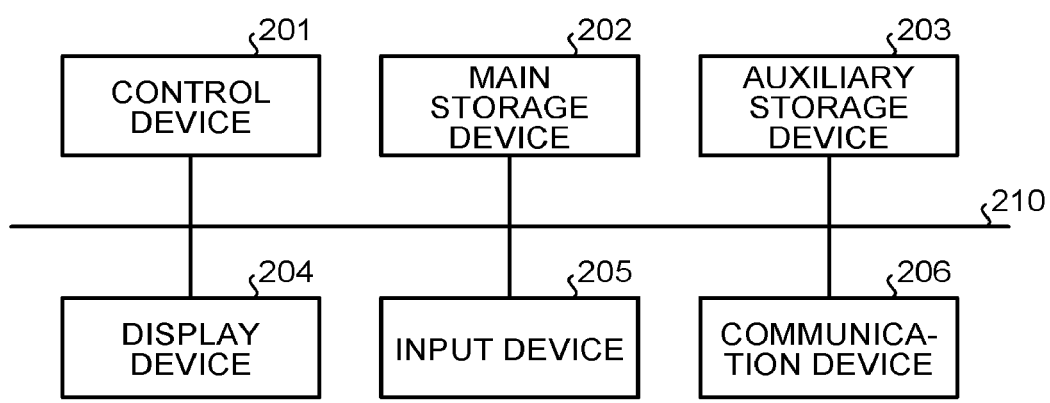
FIG. 10 illustrates an exemplary hardware configuration for the warning systems according to the first to fourth embodiments.

FIG. 10 illustrates an exemplary hardware configuration for the warning systems 100 (100-2 to 100-4) according to the first to fourth embodiments. The warning system 100 includes a control device 201, a main storage device 202, an auxiliary storage device 203, a display device 204, an input device 205, and a communication device 206. The control device 201, the main storage device 202, the auxiliary storage device 203, the display device 204, the input device 205, and the communication device 206 are connected through a bus 210.

The control device 201 executes a program read from the auxiliary storage device 203 to the main storage device 202. The control device 201 includes, for example, at least one processor, such as a CPU. The main storage device 202 includes memories, such as a read only memory (ROM) and a RAM. The auxiliary storage device 203 includes, for example, a memory card and a hard disk drive (HDD).

The display device 204 displays information. The display device 204 is, for example, a liquid crystal display. The input device 205 receives information as an input. The input device 205 includes, for example, a keyboard, a mouse, and a hardware key. Note that, as the display device 204 and the input device 205, provided may be a liquid crystal touch panel having a display function and an input function both. The communication device 206 communicates with a different device.

The program to be executed in the warning system 100 is stored as an installable file or an executable file into a computer-readable storage medium, such as a CD-ROM, a memory card, a CD-R, or a digital versatile disc (DVD), and is provided as a computer program product.

The program to be executed in the warning system 100 may be stored on a computer connected to a network, such as the Internet, and may be provided by downloading through the network. The program to be executed in the warning system 100 may be provided through a network, such as the Internet, without downloading.

The program to be executed in the warning system 100 may be installed on a ROM or the like in advance for provision.

The program to be executed in the warning system 100 has a module configuration including functions achievable by the program from the functions of the warning system 100.

The control device 201 reads and executes the program from a storage medium, such as the auxiliary storage device 203, so that the functions that the program achieves are loaded into the main storage device 202. That is the functions that the program achieves are generated on the main storage device 202.

Note that part of the functions of the warning system 100 may be achieved by hardware, such as an IC. The IC is, for example, a processor that performs dedicated processing.

In a case where functions are achieved with a plurality of processors, each processor may achieve one of the functions or may achieve two or more of the functions.

With functions achieved by a plurality of processors, information acquired by each processor may be subjected to transmission and reception through a network. That is the warning system 100 may be achieved as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A warning system comprising:
    a hardware processor configured to function as:
        an acquisition unit configured to acquire, from first sensor data including information on a target that is a machine in a factory or at a construction site, condition information on an operation of a motion of the target;
        an analysis unit configured to analyze, from second sensor data including information on a region, current state information on an object that differs from the target and that is included in the region and action prediction information on the object; and
        a calculation unit configured to calculate a degree of caution, based on the condition information on the target, the current state information on the object, and the action prediction information on the object, wherein,
    the region is a place where work requires a predetermined number of persons including a specific person, and
    the calculation unit calculates
        a first degree of caution when a number of persons in the region is less than the predetermine number of persons,
        a second degree of caution when no specific person is present in the region, and
        a third degree of caution when the predetermined number of persons including the specific person are present in the region and an improper person is present in the region.

2. The warning system according to claim 1, wherein in a case where it is identified from the condition information on the target that the target is in operation or in motion, the calculation unit calculates the degree of caution higher as the object is more likely to approach or come in contact with the target, based on the current state information on the object and the action prediction information on the object.

3. The warning system according to claim 1, wherein the acquisition unit receives first image data as the first sensor data and acquires the condition information on the target from the first image data, and
    the analysis unit receives second image data as the second sensor data and analyzes the current state information on the object and the action prediction information on the object from the second image data.

4. The warning system according to claim 3, wherein the analysis unit:
    receives a plurality of pieces of the second image data on a time-series basis;
    tracks the object included in the plurality of pieces of the second image data; calculates a travel direction and a speed of the object; and
    analyzes the action prediction information on the object, based on the travel direction and the speed of the object.

5. The warning system according to claim 1, wherein the hardware processor is further configured to function as:
    an alert notification unit configured to issue an alert notification in a case where the degree of caution calculated by the calculation unit is higher than a first threshold.

6. The warning system according to claim 1, wherein the hardware processor is further configured to function as:
    a recording unit configured to record, in a case where the degree of caution calculated by the calculation unit is higher than a second threshold, at least one of the first sensor data, the second sensor data, the condition information on the target, the current state information on the object, the action prediction information on the object, and the degree of caution.

7. The warning system according to claim 1, wherein the hardware processor is further configured to function as:
    a control unit configured to make, in a case where the degree of caution calculated by the calculation unit is higher than a third threshold, the target to be in a safe state.

8. The warning system according to claim 1, wherein the hardware processor is further configured to function as:
    a display unit configured to display information including at least one of the condition information on the target, the current state information on the object, the action prediction information on the object, and the degree of caution.

9. The warning system according to claim 1, wherein the hardware processor is further configured to function as:
    a setting unit configured to set a parameter used for controlling an operation of the acquisition unit, a parameter used for controlling an operation of the analysis unit, and a parameter used for controlling an operation of the calculation unit.

10. The warning system according to claim 9, wherein the first sensor data includes information on a plurality of targets,
    the second sensor data includes information on a plurality of regions, and the setting unit sets the parameter used for controlling the operation of the acquisition unit to each of the plurality of the targets and sets the parameter used for controlling the operation of the analysis unit to each of the plurality of the regions.

11. The warning system according to claim 1, wherein the object is a person,
the hardware processor is further configured to function as:
a recognition unit configured to collate the person with known person information, to recognize the person, and
the calculation unit calculates the degree of caution, based further on information identified from the person.

12. A warning method implemented by a computer, the method comprising:
acquiring, by a warning system, from first sensor data including information on a target that is a machine in a factory or at a construction site, condition information on an operation of a motion of the target;
analyzing, by the warning system, from second sensor data including information on a region, current state information on an object that differs from the target and that is included in the region and action prediction information on the object; and
calculating a degree of caution by the warning system, based on the condition information on the target, the current state information on the object, and the action prediction information on the object, wherein,
the region is a place where work requires a predetermined number of persons including a specific person, and
calculating the degree of caution includes calculating
a first degree of caution when a number of persons in the region is less than the predetermine number of persons,
a second degree of caution when no specific person is present in the region, and
a third degree of caution when the predetermined number of persons including the specific person are present in the region and an improper person is present in the region.

13. The warning method according to claim 12, wherein the calculating includes calculating, in a case where it is identified from the condition information on the target that the target is in operation or in motion, the degree of caution higher as the object is more likely to approach or come in contact with the target, based on the current state information on the object and the action prediction information on the object.

14. The warning method according to claim 12, wherein the acquiring includes receiving first image data as the first sensor data and acquiring the condition information on the target from the first image data, and
the analyzing includes receiving second image data as the second sensor data and analyzing the current state information on the object and the action prediction information on the object from the second image data.

15. A computer program product having a non-transitory computer readable medium including programmed instructions, wherein the instructions, when executed by a computer, cause the computer to function as:
an acquisition unit configured to acquire, from first sensor data including information on a target that is a machine in a factory or at a construction site, condition information an operation of a motion of on the target;
an analysis unit configured to analyze, from second sensor data including information on a region, current state information on an object that differs from the target and that is included in the region and action prediction information on the object; and
a calculation unit configured to calculate a degree of caution, based on the condition information on the target, the current state information on the object, and the action prediction information on the object, wherein,
the region is a place where work requires a predetermined number of persons including a specific person, and
calculating the degree of caution includes calculating
a first degree of caution when a number of persons in the region is less than the predetermine number of persons,
a second degree of caution when no specific person is present in the region, and
a third degree of caution when the predetermined number of persons including the specific person are present in the region and an improper person is present in the region.

16. The computer program product according to claim 15, wherein
in a case where it is identified from the condition information on the target that the target is in operation or in motion, the calculation unit calculates the degree of caution higher as the object is more likely to approach or come in contact with the target, based on the current state information on the object and the action prediction information on the object.

17. The computer program product according to claim 15, wherein
the acquisition unit receives first image data as the first sensor data and acquires the condition information on the target from the first image data, and
the analysis unit receives second image data as the second sensor data and analyzes the current state information on the object and the action prediction information on the object from the second image data.

* * * * *